(12) United States Patent
Boughannam

(10) Patent No.: US 8,700,413 B2
(45) Date of Patent: Apr. 15, 2014

(54) WEB SERVICES REGISTRATION FOR DYNAMIC COMPOSITION OF WEB SERVICES

(75) Inventor: Akram Boughannam, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 4084 days.

(21) Appl. No.: 10/378,569

(22) Filed: Mar. 3, 2003

(65) Prior Publication Data

US 2004/0176988 A1 Sep. 9, 2004

(51) Int. Cl.
*G06Q 10/00* (2012.01)
(52) U.S. Cl.
USPC .......................................................... 705/1.1
(58) Field of Classification Search
USPC ................................................. 705/1, 7, 500
See application file for complete search history.

(56) References Cited

U.S. PATENT DOCUMENTS

| | | | | |
|---|---|---|---|---|
| 5,377,196 A * | 12/1994 | Godlew et al. | ................ | 714/712 |
| 6,085,030 A | 7/2000 | Whitehead et al. | ...... | 395/200.33 |
| 6,182,136 B1 | 1/2001 | Ramanathan et al. | ........ | 709/224 |
| 6,205,482 B1 | 3/2001 | Navarre et al. | ................ | 709/227 |
| 6,256,771 B1 | 7/2001 | O'Neil et al. | ..................... | 717/1 |
| 6,286,047 B1 | 9/2001 | Ramanathan et al. | ........ | 709/224 |
| 6,289,382 B1 | 9/2001 | Bowman-Amuah | .......... | 709/226 |
| 7,640,348 B2 * | 12/2009 | Atwal et al. | ................... | 709/229 |
| 2001/0034627 A1 * | 10/2001 | Curtis et al. | ..................... | 705/7 |

OTHER PUBLICATIONS

The Aurora Architecture for Network-Centric Applications, <http://terpsi.ics.forth.gr/pleiades/projects/Aurora/aurora.html> , 2001.
Floch, et al., Towards Dynamic Composition of Hybrid Communication Services, *Sixth International Conference on Intelligence in Networks (Smartnet 2000). Courses.* Spring 1998, <http://www.item.ntnu.no/~plugandplay/publications/CompositionPaper7.pdf>.
A. Tost, Web services interoperability, Part 1, A multi-vendor demonstration, *IBM developerWorks*, <http://www-106.ibm.com/developerworks/webserviecs/library/ws-bpinter/?dwzone=webservices> , 2003.
M. Virdell, Business processes and workflow in the Web services world, A workflow is only as good as the business process underneath it, *IBM developerWorks*, <http://www-106.ibm.com/developerworks/webserviecs/library/ws-work.html?Open&ca=daw-ws-news> , 2003.
Sybase, User's Guide, *Web Services Integrator 2.1*, <http://manuals.ssybase.com/onlinebooks/group-wsi/wsig0210e/wsiug/@Generic__BookView?DwebQuery=user%27s+guide&DwebSearchAll=1> , 2002.
C. Nikolau, et al., Synthesis of Servies in Open Commerce Environments, *Synthesis of Services in Open Comemrce Environments*, pp. 1-9, (Nov. 2001), <http://citeseer.nj.nec.com/174885.html>.

* cited by examiner

*Primary Examiner* — Dennis Ruhl
(74) *Attorney, Agent, or Firm* — Cuenot, Forsythe & Kim, LLC

(57) ABSTRACT

A Web services composition method. The method can include compiling a set of service activation rules (SARs) for corresponding Web services in the marketplace. Selected Web services can be scheduled for execution when corresponding ones of the SARs include execution conditions satisfied by the state of the marketplace. Conversely, selected Web services can be removed from execution consideration when corresponding ones of the SARs include obviation conditions satisfied by the state of the marketplace.

12 Claims, 2 Drawing Sheets

WEB SERVICES REGISTRATION FOR DYNAMIC COMPOSITION OF WEB SERVICES

BACKGROUND OF THE INVENTION

1. Statement of the Technical Field

The present invention relates to the field of distributed computing, and more particularly to Web services.

2. Description of the Related Art

Web services represent the leading edge of distributed computing and are viewed as the foundation for developing a truly universal model for supporting the rapid development of component-based applications over the World Wide Web. Web services are known in the art to include a stack of emerging standards that describe a service-oriented, component-based application architecture. Specifically, Web services are loosely coupled, reusable software components that semantically encapsulate discrete functionality and are distributed and programmatically accessible over standard Internet protocols.

Conceptually, Web services represent a model in which discrete tasks within processes are distributed widely throughout a value net. Notably, many industry experts consider the service-oriented Web services initiative to be the next evolutionary phase of the Internet. Typically, Web services can be defined by an interface such as the Web services definition language (WSDL), and can be implemented according to the interface, though the implementation details matter little so long as the implementation conforms to the Web services interface. Once a Web service has been implemented according to a corresponding interface, the implementation can be registered with a Web services registry, such as Universal Description, Discover and Integration (UDDI), as is well known in the art. Upon registration, the Web service can be accessed by a service requestor through the use of any supporting messaging protocol, including for example, the simple object access protocol (SOAP).

In a service-oriented application environment supporting Web services, locating reliable services and integrating those reliable services dynamically in realtime to meet the objectives of an application has proven problematic. While registries, directories and discovery protocols provide a base structure for implementing service detection and service-to-service interconnection logic, registries, directories, and discovery protocols alone are not suitable for distributed interoperability. Rather, a more structured, formalized mechanism can be necessary to facilitate the distribution of Web services in the formation of a unified application.

The rapid growth and adaptation of Web services has introduced new problems which, if not resolved, may render the Web services paradigm impractical and unusable. Specifically, the vision of Web services includes a dynamic electronic marketplace where new Web services can be added dynamically, while other Web services can be removed dynamically. Still, it will be recognized by the skilled artisan that the specific services required by an end user will not always be known a priori. To that end, the electronic marketplace must be able to adapt to the needs of the end user by tailoring marketplace Web services in accordance with dynamically identifiable requirements. In such an environment, the ability to construct and compose new Web services from existing Web services can be essential in order to deliver practical and usable composite services to the end user.

Present approaches to the registration of Web services rely upon UDDI as the sole mechanism. With UDDI, services are described via a service code which remains too general and inadequate for selecting an appropriate service in response to the dynamically specified requirements of service consumers. UDDI further does not allow service providers and service consumers to register services which can be activated and accessed only in selective circumstances. Finally, UDDI remains deficient in that services cannot be grouped together and composed in a manner so as to produce tailored services which may be dynamically requested by service consumers.

SUMMARY OF THE INVENTION

The present invention is a Web service composition method which can be incorporated into a Web services integration framework through which a marketplace for Web services can be maintained. Through the use of the Web service composition method, Web services can be registered in the framework to facilitate the composition of Web services from individual Web services so that complex requests for services can be satisfied. As the requirements of the complex requests cannot be known a priori, however, the method of the present invention can provide a set of conditional rules which specify not only when a Web service can be executed, but also when a Web service cannot be executed.

The Web services composition method can include compiling a set of service activation rules (SARs) for corresponding Web services in the marketplace. Selected Web services can be scheduled for execution when corresponding ones of the SARs include execution conditions satisfied by the state of the marketplace. Conversely, selected Web services can be removed from execution consideration when corresponding ones of the SARs include obviation conditions satisfied by the state of the marketplace.

In one aspect of the invention, the scheduling step can include sequentially processing the SARs to determine whether an associated trigger event has been satisfied by the state of the marketplace in response to at least one event stored in an event queue. For each SAR in which an associated trigger event has been satisfied by the state of the marketplace, the SAR can be added to an execution agenda if an associated execution event further has been satisfied by the state of the marketplace. Additionally, individual ones of the scheduled Web services can be selected based upon a service action specified in the corresponding ones of the SARs. Once selected, the Web services can be executed.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a method and system for registering Web services in a Web services integration framework. The Web services integration framework can provide for the dynamic composition of registered Web services to tailor a specific composite Web service to accommodate the dynamically specified requirements of a Web service consumer. To enable the dynamic composition of registered Web services in the Web services integration framework, Web services can register with the Web services integration framework not only to specify the presence and availability of the Web services, but also to specify when a Web service can be activated, when a Web service can be executed, and when a Web service can be removed from the Web services integration framework.

Figure 1:
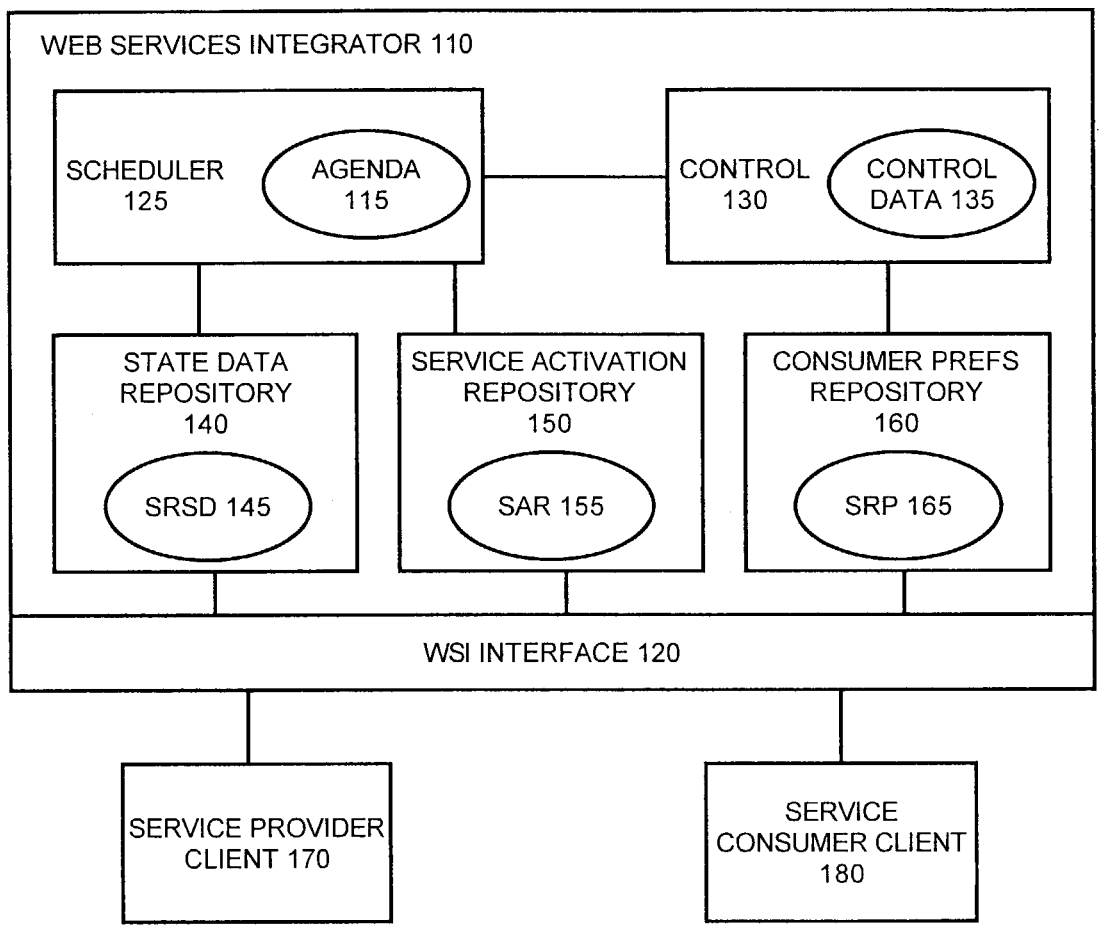
FIG. 1 is a block illustration of a Web services framework in which Web services can be dynamically registered, activated, executed and deactivated in accordance with the present invention; and, FIG. 2 is a flow chart illustrating a process for registering Web services in the Web services framework of FIG. 1 so as to enable the dynamic composition of registered Web services to produce a composite service.

FIG. 1 is a block illustration of a Web services framework in which Web services can be dynamically registered, activated, executed and deactivated in accordance with the present invention. The Web service framework can include a Web services Integrator (WSI) 110 in which individually registered Web services can be combined to produce a composite Web service. Composite Web services can be constructed in order to satisfy complex service requests which cannot be satisfied by any one Web service alone.

The WSI 110 can include a state data repository 140 in which service requests state data 145 can be stored. Service request state data 145 can include workspace state data for each service request for which the WSI processes through the composition of one or more Web services. To that end, the service request state data 145 can include data both required and produced by individual Web services which have been grouped into a composite Web service by the WSI 110. Notably, whenever a change occurs to the service requests state data 145, by virtue of an external service consumer client 180, or by virtue of an internally registered Web service, an event can be considered to have occurred.

The WSI 110 further can include a service activation repository 150 for storing individual service activation rules (SARs) 155. Each SAR 155 can include a service trigger condition, a service execution condition, a service obviation condition, and a service action. Within each SAR 155, the service trigger condition can be a logical expression which describes an event which must occur for the corresponding Web service to become activated. "Activation" as used herein, does not mean "Execution". Rather, activation refers to the placement of the Web service in an active state from which the Web service can be executed when specified conditions are met.

The service execution condition, by comparison, is a logical expression that describes a state which when satisfied, causes the Web service to be scheduled for execution. The service action portion of the SAR 155 can be a description of the result of the execution of the Web service. Finally, the service obviation condition describes a state which when encountered will cause the Web service to be removed from the list of services eligible for execution. Thus, when conditions indicate that a Web service need not remain in an active state, the Web service can be removed from the activated state through the satisfaction of the service obviation condition.

Importantly, the WSI 110 can include both a scheduler 125 and a control 130. The scheduler 125 can schedule the execution of individually registered Web services registered in an agenda 115 of Web services. The control 130, by comparison, can include control data 135 which can specify which Web services in the agenda 115 will be required to be executed to produce a suitable composite Web service able to satisfy the requirements of the service consumer client 180. More particularly, the control 130 can select individual Web services for execution based upon both the service action component of the SAR 155 for each Web service, and also the service requestor preferences 165 stored in a consumer preferences repository 160. In this way, the control 130 can recognize both the potential output and action of any one registered Web service through the service action component of the SAR 155, as well as the required output as specified in the services requestor preferences 165.

In operation, a service provider client 170 can register with a Web service with the WSI 110 through the WSI interface 120. In particular, the Web service can register by providing to the WSI interface 120 associated SAR 155 for the particular Web service. Once the SAR 155 has been added to the service activation repository 150 of the WSI 110, a service consumer client 180, or an activated Web service can change elements of the service request state data 145 in the state data repository 140 through the WSI interface 120. Any change to the service request state data 145 can cause the posting of an event to an event queue (not shown) in the scheduler 125.

Responsive to an event which has been posted in the queue, the scheduler 125 can select individual Web services for execution. Specifically, all Web services having a SAR 155 whose trigger conditions can be satisfied can be selected for further consideration. Subsequently, all triggered ones of the Web services whose corresponding SARs 155 include service activation rules which can be satisfied based upon a current state in the state data repository 140 can be placed on the execution agenda 115. Similarly, where the service obviation conditions for any one Web service having a SAR 155 in the agenda 115 can be met, the SAR 155 associated with that Web service can be removed from the agenda 115.

Figure 2:
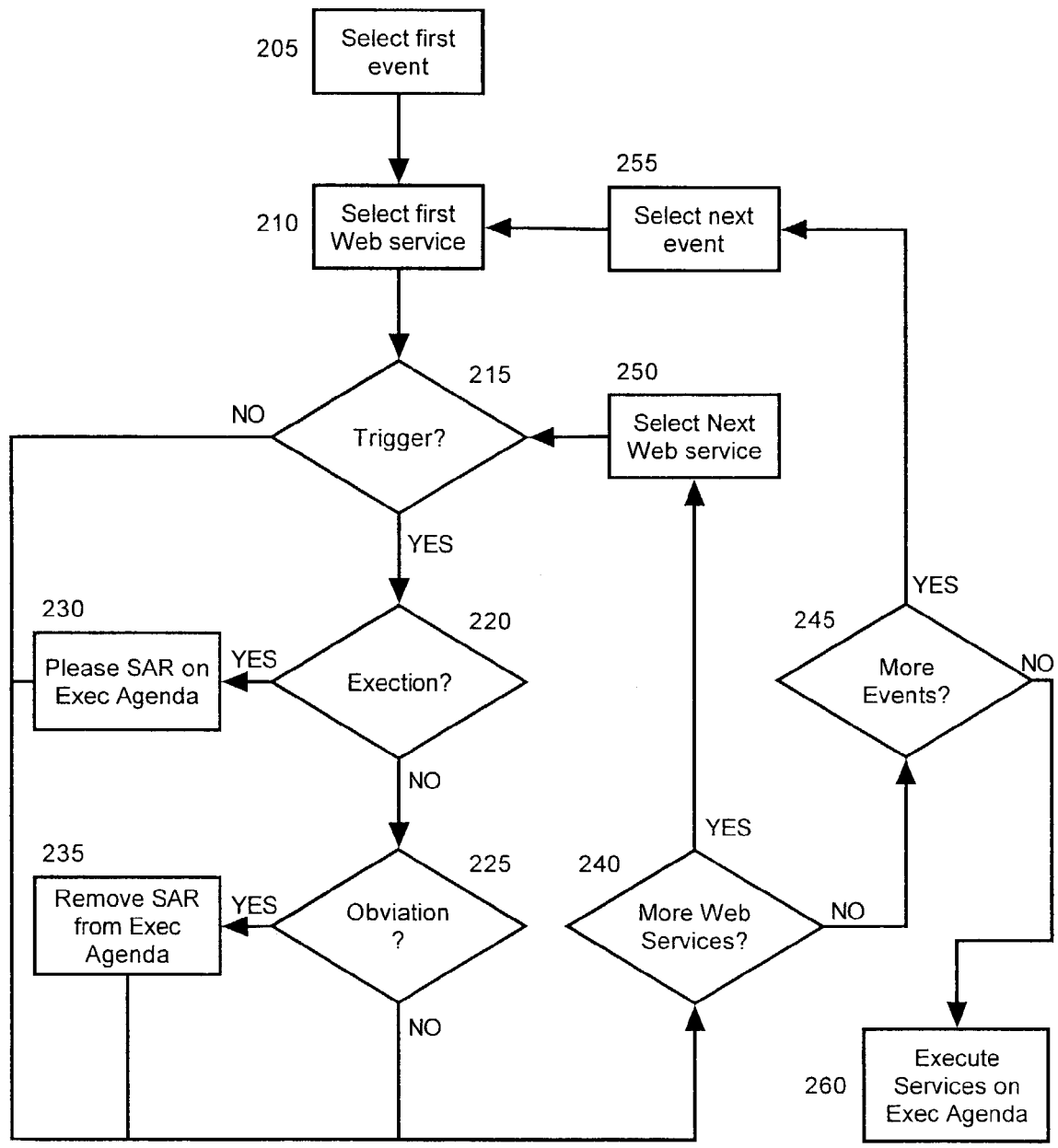

FIG. 2 is a flow chart illustrating a process for registering Web services in the scheduler 125 of the WSI 110 of FIG. 1 so as to enable the dynamic composition of registered Web services to produce a composite service. Beginning in block 205, a first event in the event queue can be selected. In block 210, a SAR for a first Web service can be considered. In decision block 215, if the service trigger condition for the SAR cannot be satisfied based upon the current state, and further if in decision block 240 additional SARs remain to be considered for the event, in block 250, the SAR for the next Web service registered in the framework can be considered. Otherwise, the process can continue through decision block 220.

In decision block 220, it can be determined whether the service execution condition for the SAR can be met. If so, in block 230 the SAR can be added to the execution agenda. If not, in block 225, it can be determined whether the service obviation condition for the SAR can be met. If so, in block 235 the SAR can be removed from the execution agenda. In either case, in decision block 240, it can be determined if other SARs remain to be considered for the event. If so, the next SAR can be selected in block 250 and the process can repeat. Otherwise, in decision block 245 it can be determined whether other events remain to be processed in the event queue. If so, the next event can be selected in block 255 and the process can repeat through block 210.

In decision block 245, if no further events remain in the event queue, in block 260, the scheduler can execute the services listed in the execution agenda. In particular, through consultation with the control element of the WSI, the SAR can execute each scheduled service, while collecting the results of the execution as the case may be. In this way, the effect of a composite Web service can be simulated through the sequential execution of multiple granular Web services which have registered with the WSI.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. In a marketplace for Web services, a computer-implemented Web services composition method, the method comprising the steps of:
   compiling a set of service activation rules (SARs) for corresponding Web services in the marketplace;
   scheduling, using a processor within a computer, selected Web services for execution when corresponding ones of said SARs comprise execution conditions satisfied by a state of the marketplace; and,
   removing said selected Web services from execution consideration when said corresponding ones of said SARs comprise obviation conditions satisfied by the state of the marketplace.

2. The method of claim 1, wherein said scheduling step comprises the steps of:
   responsive to at least one event stored in an event queue, sequentially processing said SARs to determine whether an associated trigger event has been satisfied by the state of the marketplace; and,
   for each SAR in which an associated trigger event has been satisfied by the state of the marketplace, adding said SAR to an execution agenda if an associated execution event further has been satisfied by the state of the marketplace.

3. The method of claim 1, further comprising the steps of:
   selecting individual ones of said scheduled Web services based upon a service action specified in said corresponding ones of said SARs; and,
   executing said selected Web services.

4. A machine readable storage having stored thereon a computer program for Web services composition in a marketplace for Web services, the computer program comprising a routine set of instructions for causing a machine to perform the steps of:
   compiling a set of service activation rules (SARs) for corresponding Web services in the marketplace;
   scheduling selected Web services for execution when corresponding ones of said SARs comprise execution conditions satisfied by a state of the marketplace; and,
   removing said selected Web services from execution consideration when said corresponding ones of said SARs comprise obviation conditions satisfied by the state of the marketplace.

5. The machine readable storage of claim 4, wherein said scheduling step comprises the steps of:
   responsive to at least one event stored in an event queue, sequentially processing said SARs to determine whether an associated trigger event has been satisfied by the state of the marketplace; and,
   for each SAR in which an associated trigger event has been satisfied by the state of the marketplace, adding said SAR to an execution agenda if an associated execution event further has been satisfied by the state of the marketplace.

6. The machine readable storage of claim 4, further comprising the steps of:
   selecting individual ones of said scheduled Web services based upon a service action specified in said corresponding ones of said SARs; and,
   executing said selected Web services.

7. In a marketplace for Web services, a computer-implemented Web services composition method, the method comprising the steps of:
   posting a service activation rule (SAR) for a Web service in a Web services integrator through a Web services interface;
   determining, using a processor within a computer, whether a trigger condition specified in said SAR has been met by a state of the marketplace;
   if said trigger condition has been met, further determining whether an execution condition in said SAR has been met by the state of the marketplace; and,
   if said execution condition has been met, placing said SAR in an execution agenda from which said Web service can be executed if required to form a composite Web service to satisfy a complex Web service request.

8. The method of claim 7, further comprising the steps of:
   determining whether an obviation condition specified in said SAR has been met by the state of the marketplace; and,
   if said obviation condition has been met, removing said SAR from said execution agenda.

9. The method of claim 7, further comprising the steps of:
   consulting a service action entry in said SAR to determine an expected result which would be produced by executing said Web service;
   determining a result required by a complex service request; and,
   executing said Web service if said expected result corresponds to said required result.

10. A machine readable storage having stored thereon a computer program for Web services composition in a marketplace for Web services, the computer program comprising a routine set of instructions for causing a machine to perform the steps of:
    posting a service activation rule (SAR) for a Web service in a Web services integrator through a Web services interface;
    determining whether a trigger condition specified in said SAR has been met by the state of the marketplace;
    if said trigger condition has been met, further determining whether an execution condition in said SAR has been met by the state of the marketplace; and,
    if said execution condition has been met, placing said SAR in an execution agenda from which said Web service can be executed if required to form a composite Web service to satisfy a complex Web service request.

11. The machine readable storage of claim 10, further comprising the steps of:

determining whether an obviation condition specified in said SAR has been met by the state of the marketplace; and, if said obviation condition has been met, removing said SAR from said execution agenda.

12. The machine readable storage of claim 10, further comprising the steps of:

consulting a service action entry in said SAR to determine an expected result which would be produced by executing said Web service;

determining a result required by a complex service request; and, executing said Web service if said expected result corresponds to said required result.

* * * * *